(12) United States Patent
Gupta et al.

(10) Patent No.: US 11,188,784 B2
(45) Date of Patent: Nov. 30, 2021

(54) INTELLIGENT PEOPLE-GROUP CATALOGING BASED ON RELATIONSHIPS

(71) Applicant: ADOBE INC., San Jose, CA (US)

(72) Inventors: Subham Gupta, Roorkee (IN); Ajay Bedi, Hamirpur (IN)

(73) Assignee: ADOBE INC., San Jose, CA (US)

( * ) Notice: Subject to any disclaimer, the term of this patent is extended or adjusted under 35 U.S.C. 154(b) by 102 days.

(21) Appl. No.: 16/510,215

(22) Filed: Jul. 12, 2019

(65) Prior Publication Data

US 2021/0012144 A1 Jan. 14, 2021

(51) Int. Cl.
*G06K 9/62* (2006.01)
*G06K 9/00* (2006.01)

(52) U.S. Cl.
CPC ......... *G06K 9/622* (2013.01); *G06K 9/00228* (2013.01); *G06K 9/00288* (2013.01); *G06K 9/6215* (2013.01)

(58) Field of Classification Search
CPC .............. G06K 9/622; G06K 9/00302; G06K 9/00288; G06K 9/6215; G06K 9/00677; G06K 2209/27; G06K 9/00228; G06F 16/583

See application file for complete search history.

(56) References Cited

U.S. PATENT DOCUMENTS

| | | | | |
|---|---|---|---|---|
| 9,836,183 | B1 * | 12/2017 | Love et al. | G06F 3/00 |
| 2008/0310688 | A1 * | 12/2008 | Goldberg | G06F 16/58 382/118 |
| 2014/0250175 | A1 * | 9/2014 | Baldwin | H04W 4/08 709/204 |
| 2015/0262037 | A1 * | 9/2015 | Li | G06K 9/6296 382/159 |
| 2016/0148298 | A1 * | 5/2016 | Tang et al. | G06K 9/00 |
| 2016/0255410 | A1 * | 9/2016 | Itoh | H04N 21/25891 725/14 |
| 2018/0005088 | A1 * | 1/2018 | Farfade | G06K 9/6247 |

* cited by examiner

*Primary Examiner* — Siamak Harandi
(74) *Attorney, Agent, or Firm* — Shook, Hardy & Bacon L.L.P.

(57) ABSTRACT

Methods and systems are provided for determining intelligent people-groups based on relationships between people. In embodiments, a photo dataset is be processed to represent photos of the photo dataset using vectors. These vectors include the importance of people in the photos. The photos are analyzed to determine similarity between the photos. Similarity is indicative of relationships between the photos of the photo dataset. The similarity is based on the people in the photos. The photos are clustered based on the similarity. In clustering the photos, clustering parameters determined from location information associated with the photos of the photo dataset are used.

20 Claims, 8 Drawing Sheets

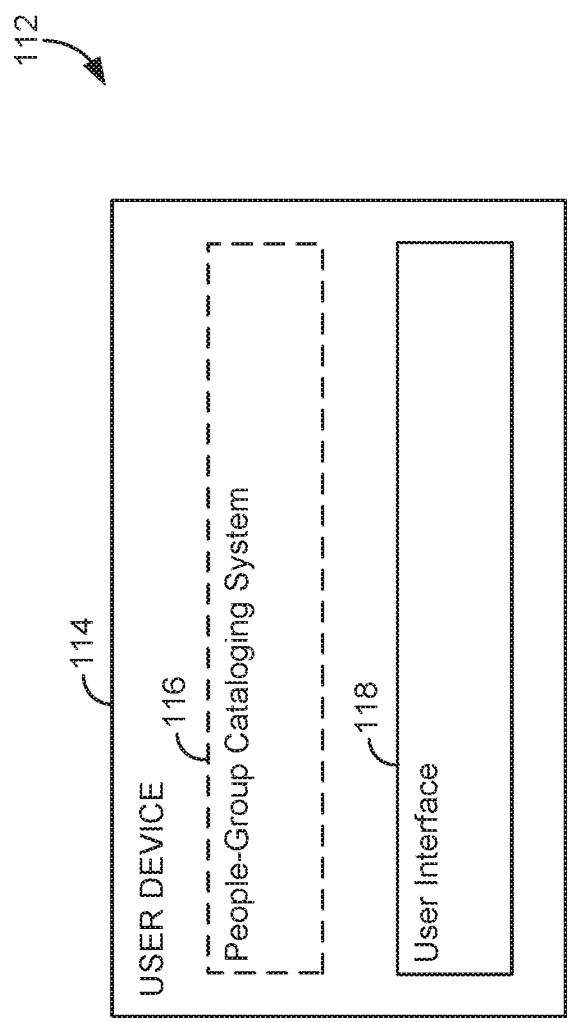

INTELLIGENT PEOPLE-GROUP CATALOGING BASED ON RELATIONSHIPS

BACKGROUND

Oftentimes, users desire to organize images (e.g., photos) into albums based on various preferences. For instance, users may create albums based on date-time and/or location information. In many cases, users may wish to organize photographs in a more intelligent manner. For example, a user can desire photos in a photo dataset to be organized based on relationships between people in the photos (e.g., social circles). Organizing photos based on the people in the photos, however, can be difficult. In particular, it can be cumbersome and time-consuming to manually create albums associated with various social circles. For example, it is cumbersome to go through each photo in a photo dataset to move and/or tag each photo to an album corresponding to a social circle related to a person in a photo.

As such, in an effort to organize photos in albums based on people in the photos, conventional systems can identify a person in a photo. In particular, such conventional systems can detect and/or recognize a person in photos and organize photos with the person into an album related to the person. In this way, conventional systems merely assign photos to an album for the identified person in a photo (e.g., an album of a person containing all photos of that person). However, such systems have difficulty in identifying relationships between people (e.g., in photos in a photo dataset). Because of this difficulty in identifying relationships between people, conventional systems are not able to create albums based on social circles (e.g., based on identified relationships). Further, such conventional systems also fail to recognize that a person can belong to multiple social circles.

SUMMARY

Embodiments of the present invention are directed to facilitating the intelligent identification of people-groups based on relationships between people in the photos of a photo dataset. In this regard, relationships can be identified by analyzing how people appear in relation to each other in photographs of a photo dataset. In some cases, similarity between photos in the photo dataset can be determined (e.g., based on the people depicted in the photos) and used during clustering based on the people in the photos. In operation, clustering can be used to group the photos of the photo dataset to identify people-groups. In some embodiments, and advantageously, a customized density-based spatial clustering of applications with noise ("DBSCAN") algorithm can be used to perform the clustering. Such a customized DBSCAN algorithm can be implemented by first performing clustering using a DBSCAN algorithm to determine optimal parameters based on location information (e.g., represented using latitude and longitude) and then using the optimal parameters for the DBSCAN algorithm to cluster photos based on similarity. People-groups indicating sets of related people can be identified from the clusters based on similarity.

BRIEF DESCRIPTION OF THE DRAWINGS

FIG. 1B depicts another example configuration of an operating environment in which some implementations of the present disclosure can be employed, in accordance with various embodiments.

DETAILED DESCRIPTION

Figure 1A:
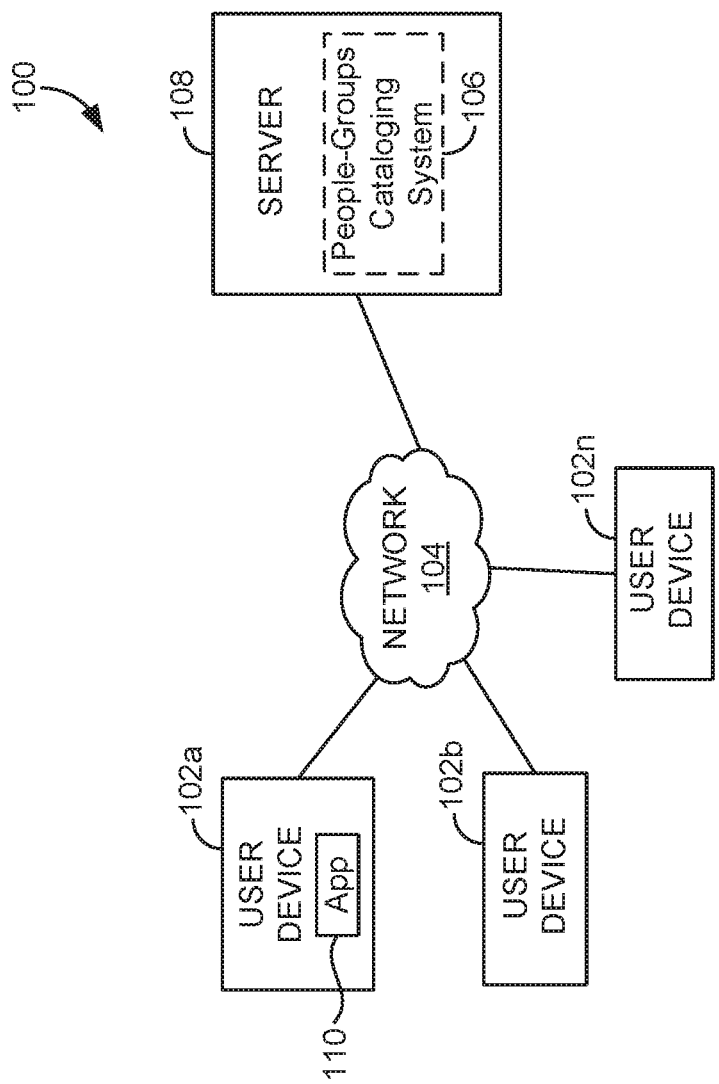
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

Oftentimes, users desire photos to be organized into group albums where a group album relates to a group of people in a photo dataset based on the people depicted in the photos. In particular, photos can be organized into group albums based on the relationships between the people depicted in the photos. Conventional methods have not been successful in intelligently creating albums based on the relationships between people depicted in the photos. For instance, manual methods of creating group albums based on relationships between people depicted in the photos are cumbersome and time-consuming, requiring a user to go through every photo in a photo dataset and move and/or tag the photos to a group album related to a person in a photo. Automated methods of creating albums have been created to reduce manual creation of albums. However, automated conventional methods typically create individual person albums (e.g., an album of a single person). As such, conventional methods are not capable of recognizing that a person can belong to multiple groups of people (e.g., assign the same photo of a person to more than one album).

Accordingly, embodiments of the present disclosure present a solution that intelligently identifies people-groups based on relationships between people in the photos of a photo dataset. Such relationships can be identified by analyzing how people appear in relation to each other in photographs of a photo dataset. Identified relationships can be used to determine people-groups. Advantageously, people-groups can be a dynamic grouping of people in photographs (based on relationships) that allows for better organizing photos into group albums corresponding to relationships between people of the photo dataset. One advantage of such grouping is that people-group albums allow for easy navigation to photos for a specific group of people. For instance, if a user wishes to only see photos of school friends, a people-group album of school friends can be selected for viewing. Such grouping is also advantageous because organizing photos into group albums based on the relationships can reflect specific filtering based on a group of people in a photo dataset. For instance, such organized photos in one group album can be photos a user would show one group of friends but not another (e.g., a group album of photos of coworkers versus a group album of photos of family members). In addition, people-group albums based on relationships are advantageous because they can speed up a creative workflow. In particular, user often create collages or other representations of photos that belong to the same group of people. For example, a user might wish to create a collage of family members or create a poster with friends. Arranging photos in a photo dataset using people-group albums can allow a user to quickly select input photos from the set of photos specific to a particular people-group album during the creation of such a representations of photos rather than searching for photos from a large mix of all catalog photos of a photo dataset.

At a high level, some implementations of the technology described herein determine intelligent people-groups based on relationships between people. In particular, how people appear in various photos in a photo dataset relative to each other can be analyzed to determine how the people of the photo dataset relate to one other. For instance, a group of people that frequently appear together in photos can indicate that those people have a common relationship. Such a common relationship between a group of people can be indicative of a social circle (e.g., that the group of people are coworkers, family members, college buddies, etc.).

Relationships between people can be determined using information associated with the photos. Such information that can be used to determine relationships between people in a photo dataset can include people information (e.g., people in a photo), location information (e.g., where a photo was taken), and capture-date information (e.g., time and/or date that that a photo was taken). Upon determining relationships between people based on how the people appear relative to each other, the system can identify people-groups based on the relationships (e.g., groups of people with a common relationship indicating the people belong to the same group). Identified people-groups can be used to organize the photos. In particular, photos with a person/people of a people-group can be combined into a people-group album (e.g., indicating a social circle). It should be appreciated that a person can belong to more than one people-group. For example, if a family member is also a coworker, photos of that person can be added to albums corresponding to both family members and coworkers. Such people-groups can be dynamically updatable as new photos (containing new people) are added to the photo dataset.

In operation, to determine relationships between people in a photo dataset to identify people-groups, the photos of a photo dataset can first be processed. Processing the photos can include determining and/or identifying photo information associated with the photos. Such associated photo information can include people information (in a photo), location information (that a photo was taken), and capture-date information (time and/or date that that a photo was taken). For instance, processing a photo can include performing face detection and recognition. Further processing can include transforming photos and associated photo information into photo representations. In embodiments a photo representation can represent a photo in vector form (e.g., vectorizing the data). The photo dataset can also be normalized. In particular, the photos and associated photo information (e.g., in vector form) can be normalized. Normalizing photos and associated photo information can prevent bias from the data (e.g., based on frequency of appearance of a person in photos). For instance, a photo dataset often includes a disproportionate number of photos related to a particular group (e.g., of the owner of the photo dataset and/or the owner's immediate family members). Normalizing the photo dataset can prevent or lessen bias in the system when identifying people-groups. To perform normalization, values of people in the photo dataset can be determined and applied to the photos and associated photo information. A person value can generally indicate how much value a person brings to a group. For instance, a person that frequently appears in photos can have a lesser person value than a person that infrequently appears in photos. Applying such a person value as a weight to photos and associated photo information can prevent or lessen bias in the system. For example, a person who frequently appears in photos adds less value to a photo compared to a person who only appears in a few photos. The processed photos of the photo dataset can then be used determine relationships between people in a photo dataset to identify people-groups (e.g., by clustering the photos based on similarity).

Similarity between photos in the photo dataset can be determined. Similarity can generally be defined as how related two photos are based on the people in the photos. For instance, if a photo has two people and a second photo has two people, similarity between the two photos can be based on the relationship between the people in the two photos. In particular, similarity can be determined based on the difference between two vectors (e.g., vectors of processed photos) that represent two photos (e.g., for which similarity is being determined). A photo vector can be based on the number of people that appear in the photo dataset. For instance, a vector can have dimensions based on the number of people in the photo dataset. As an example, in a photo dataset with five people, the dimension of the vector can be five. The photo vectors used to determine similarity can incorporate the person values indicating the importance for each person in a photo. Similarity between photos can be used in clustering the photos to determine people-groups based on relationships between people in the photo dataset.

Clustering can be used to group the photos of the photo dataset to identify people-groups. In particular, a customized density-based spatial clustering of applications with noise ("DBSCAN") algorithm can be used to perform the clustering. Clustering using a DBSCAN algorithm can be advantageous because a number of clusters does not need to be defined. Instead, DBSCAN determines clusters based on two input parameters of the algorithm (e.g., epsilon and the minimum number of points required to form a cluster). Epsilon (e.g., ε) can indicate how close points should be to be designated as a cluster. The minimum number of points required to form a cluster (e.g., minPts) can indicate a number of neighbors a point should have to be included in a cluster. Such a customized DBSCAN algorithm can be implemented by first performing clustering using a DBSCAN algorithm to determine optimal parameters based on location information (e.g., represented using latitude and longitude) and then using the optimal parameters for the DBSCAN algorithm to cluster photos based on similarity. Outlier photos can be added to the clustered photos. An outlier photo can generally be a photo from which relationship information is not readily available. For instance, an outlier photo can only have one person. To add the outlier photos to the clusters of photos (e.g., clusters based on association vectors), capture-date data of a photo can be used. In particular, an outlier photo can be added to a cluster of photos with a maximum number of photos with the same capture-date.

People-groups can be identified from the clusters. For instance, every cluster (e.g., clusters with added outlier photos) can designate a people-group. A people-group can generally be a group of similarly related people (e.g., coworkers, family members, etc.). In a cluster, each photo can be iterated through to identify associated people. A list for the people-group can be created based on the identified people. The identified people-groups can be refined (e.g., to remove redundant people from a group and/or to merge people-groups that overlap).

Upon identifying people-groups, photos in the photo dataset can be grouped into albums based on the people-groups. Such people-group albums can include photos based on the clusters (e.g., the clustered photos, photos of people belonging to the people-group). In some embodiments, people in the photo dataset can be assigned one or more group identifiers (e.g., indicating one or more people-groups that a person belongs to). In some other embodiments, when a user is satisfied with a people-group, the people-group can be named. Upon adding a name to a people-group, the people-group can be prevented from undergoing any further modification. In some embodiments, if a people-group is not named and new photos are added (e.g., to the photo database), then the people-group can be further modified.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 8.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A can be implemented via any type of computing device, such as one or more of computing device 800 described in connection to FIG. 8, for example. These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media can include computer-readable instructions executable by the one or more processors. The instructions can be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110. An example application 110 can be any one of ADOBE LIGHTROOM, ADOBE PHOTOSHOP ELEMENTS, and/or ADOBE PHOTOSHOP EXPRESS.

The application 110 can generally be any application capable of facilitating the exchange of information between the user devices and the server(s) 108 in carrying out people-group cataloging based on people-groups identified from relationships between people in photos of a photo dataset. People-group cataloging can include creating people-group albums using the identified people-groups by assigning photos of the photo dataset to the people-group albums based on people in the photos (and the people-group(s) the people belong to). In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application 110 is integrated into the operating system (e.g., as a service). It is therefore contemplated herein that "application" be interpreted broadly.

In accordance with embodiments herein, the application 110 facilitates people-group cataloging based on people-groups identified from relationships between people in photos of a photo dataset. In embodiments, a photo dataset can be received (e.g., for cataloging based on people-groups). The photo dataset can be selected from a repository, for example, a repository stored in a data store accessible by a network or stored locally at the user device (e.g., user device 102a). Based on the selected photo dataset, (e.g., provided via a user device or server), the photos of the photo dataset can be processed. This can include determining and/or identifying people in the photos, vectorizing the photos (and associated photo information), and/or normalizing vectorizing the photos (and associated photo information). Similarity can be determined between the photos and used when clustering the photos. From clustered photos, people-groups can be identified. The identified people-groups can be output to a user, for example, to the user via the user device 102a. In this regard, the identified people-groups can be displayed via a display screen of the user device. A user can input a name for one or more of the people-groups. Such a name can designate a particular people-group album.

As described herein, server 108 can facilitate people-group cataloging based on people-groups identified from relationships between people in photos of a photo dataset via people-group cataloging system 106. Server 108 includes one or more processors, and one or more computer-readable media. The computer-readable media includes computer-readable instructions executable by the one or more processors. The instructions can optionally implement one or more components of people-group cataloging system 106, described in additional detail below.

For cloud-based implementations, the instructions on server 108 can implement one or more components of people-group cataloging system 106, and application 110 can be utilized by a user to interface with the functionality implemented on server(s) 108. In some cases, application 110 comprises a web browser. In other cases, server 108 may not be required, as further discussed with reference to FIG. 1B. For example, the components of people-group cataloging system 106 can be implemented completely on a user device, such as user device 102a. In this case, people-group cataloging system 106 can be embodied at least partially by the instructions corresponding to application 110.

Referring to FIG. 1B, aspects of an illustrative people-group cataloging system are shown, in accordance with various embodiments of the present disclosure. FIG. 1B depicts a user device 114, in accordance with an example embodiment, configured to allow for people-group cataloging based on people-groups identified from relationships between people in photos of a photo dataset using a people-group cataloging system 116. The user device 114 can be the same or similar to the user device 102a-102n and can be configured to support the video reframing system 116 (as a standalone or networked device). For example, the user device 114 can store and execute software/instructions to facilitate interactions between a user and the people-group cataloging system 116 via the user interface 118 of the user device.

Figure 2:
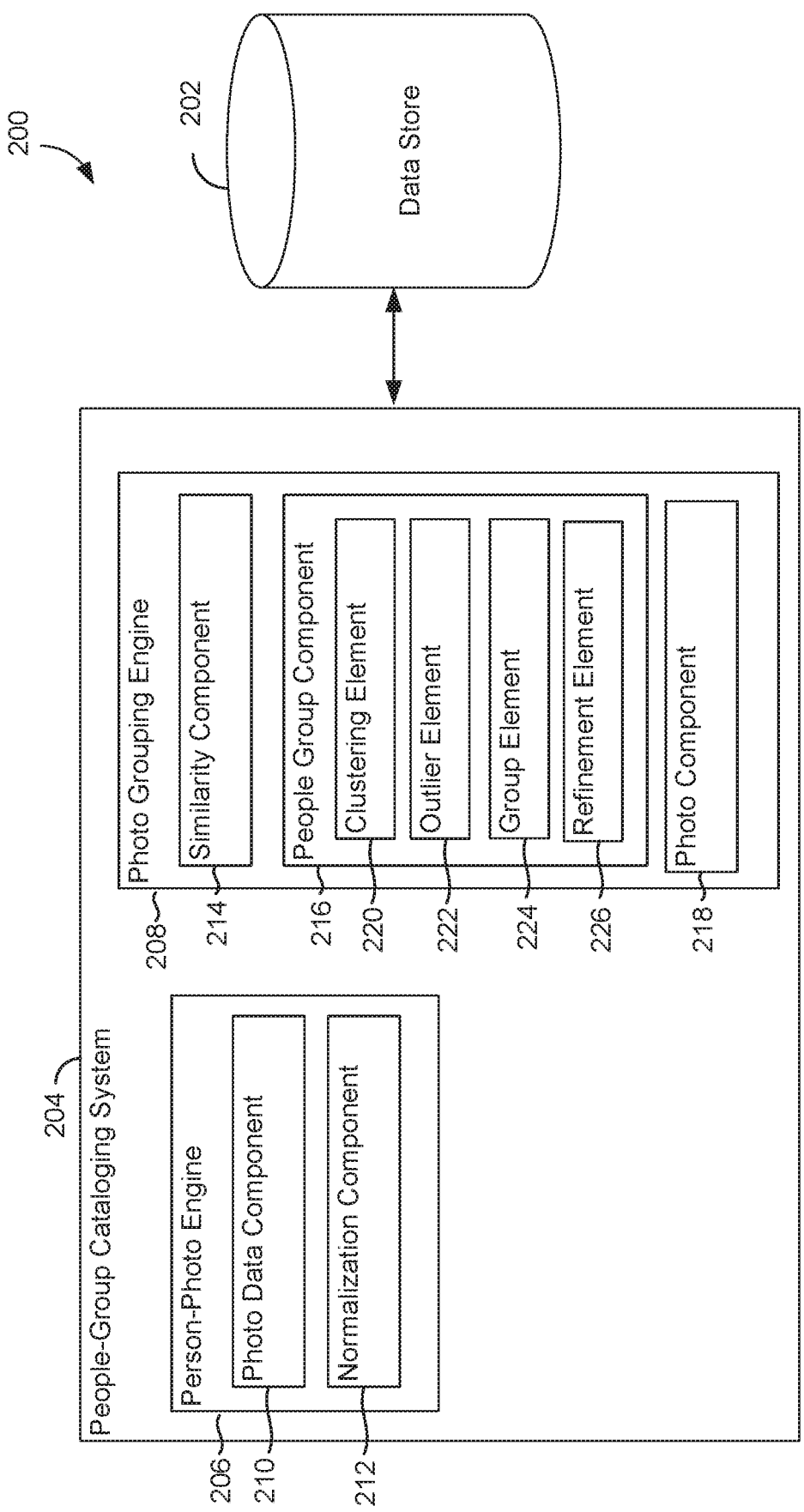
FIG. 2 depicts a further example configuration of an operating environment in which some implementations of the present disclosure can be employed, in accordance with various embodiments of the present disclosure.

FIG. 2 depicts another example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 8. It should be understood that operating environment 200 shown in FIG. 2 is an example of one suitable operating environment. Among other components not shown, operating environment 200 includes a number of user devices, networks, and server(s).

People-group cataloging system 204 can intelligently identify people-groups for a photo dataset based on relationships between people in photos of the photo dataset. In particular, the system can analyze how people appear in various photos in a photo dataset relative to each other to determine how the people relate to each other. For instance, a group of people that frequently appear together in photos can indicate that the group of people have a common relationship. Such a common relationship between a group of people can be indicative of a social circle (e.g., that the group of people are coworkers, family members, college buddies, etc.). Identified people-groups can be used to catalog photos of the photo dataset into group albums.

Relationships between people can be determined using information associated with the photos. Such information that can be used to determine relationships between people in a photo dataset can include people information (e.g., identification of people in a photo), location information (e.g., where a photo was taken), and capture-date information (e.g., time and/or date that that a photo was taken). Upon determining relationships between people based on how the people appear relative to each other, the system can identify people-groups based on the relationships (e.g., groups of people with a common relationship indicating the people belong to the same group). The people-groups can be used to organize the photos. In particular, photos with a person/people of a people-group can be combined into an album. It should be appreciated that a person can belong to more than one people-group. For example, if a family member is also a coworker, photos of that person can be added to albums corresponding to both family members and coworkers. Such people-groups can be dynamically updatable as new photos (containing new people) are added to the photo dataset.

As shown, people-group cataloging system 204 can operate in conjunction with data store 202. Data store 202 can store computer instructions (e.g., software program instructions, routines, or services), data, and/or models used in embodiments described herein. In some implementations, data store 202 can store information or data received via the various engines and/or components of people-group cataloging system 204 and provide the engines and/or components with access to that information or data, as needed. Although depicted as a single component, data store 202 can be embodied as one or more data stores. Further, the information in data store 202 can be distributed in any suitable manner across one or more data stores for storage (which can be hosted externally).

In embodiments, data stored in data store 202 can include photos and associated photo information. Such associated photo information can include people information (in a photo), location information (that a photo was taken), and capture-date information (time and/or date that that a photo was taken). People information can be based on one or more people identified in a photo. In embodiments, identification of people in a photo can be performed using a background service. For instance, a photo can be received and processed by performing face detection and recognition. In particular, face data can be used for detection and recognition. Face data can include unique face identifiers (e.g., face-id or Fid) and corresponding person identifiers (e.g., person-id or Pid) and/or asset identifiers (e.g., asset-id or Xid). A face identifier can be based on one or more methods capable of identifying a person based on, for instance, facial features. A person identifier can be indicative of a person that corresponds to a particular face identifier (e.g., person name or other designation). An asset identifier can be used to indicate a photo (e.g., a photo ID).

In some cases, data store 202 receives data from user devices (e.g., a photo received by user device 102a or another device associated with a user, via, for example, application 110). In other cases, data is received from one or more data stores in the cloud. As an example, one or more photos (e.g., a photo dataset of photos) is received for people-group cataloging by people-group cataloging system 204. The photo(s) can be received, for instance, from a user at a user device. The user can select or input the photo(s) in any available manner. For example, a user can take a picture using a camera on a device, for example, user device 102a-102n and/or user device 114 of FIGS. 1A-1B. As another example, a user can select the photo(s) from a repository stored in a data store accessible by a network or stored locally at the user device 102a-102n and/or user device 114 of FIG. 1A-1B. In other embodiments, a user can input the photo(s) by inputting a link or URL. The people-group cataloging system 204 can process the photo(s) as further discussed with reference to person-photo engine 206.

People-group cataloging system 204 can include person-photo engine 206 and photo grouping engine 208. The foregoing engines of people-group cataloging system 204 can be implemented, for example, in operating environment 100 of FIG. 1A and/or operating environment 112 of FIG. 1B. In particular, those engines can be integrated into any suitable combination of user devices 102a and 102b through 102n and server(s) 108 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the people-group cataloging system 204.

Person-photo engine 206 can process photos of a photo dataset for intelligent people-group cataloging. In particular, photos of a photo dataset can be processed for use in identifying people-groups. For instance, photos can be analyzed to determine and/or identify people in the photos of the photo dataset. Photos and associated photo information can also be organized to represent the photos and associated photo information using photo identifiers along with a listing of people in each photo. In addition, the photos and associated photo information can be transformed into photo representations. Such photo representations can use a vector form (e.g., vectorizing the photos and associated photo information). Further, the vectorized photos and associated photo information can be normalized.

Person-photo engine 206 can include photo data component 210 and normalization component 212. The foregoing components of person-photo engine 206 can be implemented, for example, in operating environment 100 of FIG. 1A and/or operating environment 112 of FIG. 1B. In particular, those components can be integrated into any suitable combination of user devices 102a and 102b through 102n and server(s) 108 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the person-photo engine 206.

Photo data component 210 can facilitate the processing of photos of a photo dataset. Processing the photos can include determining and/or identifying photo information associated with the photos. Processing of photos can generate a feature set (e.g., of data) that can be used to apply machine learning techniques over the unique representation of photo dataset-data (e.g., the feature set of data). Such a feature set can include the photos and photo information associated with the photos that comprise the photo dataset. Applying machine learning techniques can allow the people-group cataloging system to perform people-group cataloging. The feature set of data can include photos and the associated photo information. Such associated photo information can include people information (e.g., people in a photo), location information (e.g., where a photo was taken), and capture-date information (e.g., time and/or date that that a photo was taken). In some embodiments, photo data component 210 can directly process the photos. In other embodiments, photo data component 210 can send the photos to a backend server (e.g., background service) that can process the photos.

In embodiments, processing a photo can include performing face detection and recognition. In particular, face data can be used for facial detection and recognition of people in photos. Face data can include, for example, facial features. A detected face (e.g., based on face data) can be indicated using a unique face identifier (e.g., face-id or Fid). A face identifier can be based on one or more methods capable of identifying a person based on, for instance, face data (e.g., facial features). Upon determining a face identifier for a photo, a corresponding person identifier (e.g., person-id or Pid) and asset identifier (e.g., asset-id or Xid) can be determined. A person identifier can be indicative of a person that corresponds to a particular face identifier (e.g., person name or other designation). An asset identifier can be used to indicate a photo (e.g., a photo ID). In some embodiments, location information and/or capture-date information can be determined using metadata associated with a photo (e.g., GPS-based location information, time-stamp information, etc.).

Photo data component 210 may further process the photos and the identified associated photo information by organizing the photos and associated photo information. Organizing the photos and associated photo information (e.g., feature set of data) can include representing the photos and associated photo information (e.g., data) using photo identifiers along with a listing of people in each photo (e.g., using a person identifier). As an example, if there is a photo dataset with six photos {x1, x2, x3, x4, x5, 6x} that includes five unique people {P1, P2, P3, P4, P5}. Such a photo dataset can organized as:

| Asset ID | List of People |
|----------|----------------|
| x1 | [P1, P2] |
| x2 | [P1, P4] |
| x3 | [P1, P5] |
| x4 | [P1, P2, P3] |
| x5 | [P2, P3] |
| x6 | [P3, P4] |

Further, processing the photos and the identified associated photo information can include transforming the feature set of data into vector form (e.g., vectorizing the data). A sparse matrix can be used such that each row can represent a photo identifier and each column can represent a person identifier. For instance, using such a sparse matrix, the value of $X[i][j]$ can be set to equal one if an $i^{th}$ photo contains $P(j)$ (e.g., where a value of one indicates the presence of person (j) in the $i^{th}$ photo). Using the above example of the photo dataset with the six photos {x1, x2, x3, x4, x5, 6x} that includes five unique people {P1, P2, P3, P4, P5}; such a photo dataset can be transformed into the following sparse matrix:

|    | P1 | P2 | P3 | P4 | P5 |
|----|----|----|----|----|----|
| x1 | 1  | 1  | 0  | 0  | 0  |
| x2 | 1  | 0  | 0  | 1  | 0  |
| x3 | 1  | 0  | 0  | 0  | 1  |
| x4 | 1  | 1  | 1  | 0  | 0  |
| x5 | 0  | 1  | 1  | 0  | 0  |
| x6 | 0  | 0  | 1  | 1  | 0  |

Normalization component 212 can be used to normalize the feature set of data. To normalize the feature set of data, values of people in the photo dataset can be determined. A person value can generally indicate how much value a person brings to a group. A photo dataset often includes a disproportionate number of photos related to a particular group (e.g., of the owner of the photo dataset and/or the owner's immediate family members). Using values for people can normalize the data to prevent or lessen bias in the system when identifying people-groups. In embodiments, normalization component 212 can use inverse document frequency ("IDF") to determine values of people in the photo dataset. For instance, an example equation for IDF is: IDF(p)=log (total number of photos/number of photos with person p). In particular, IDF can be used to weight the feature set of data. Continuing with the above example of the photo dataset with the six photos {x1, x2, x3, x4, x5, 6x} that includes five unique people {P1, P2, P3, P4, P5}; the normalized photo dataset can be:

|    | P1   | P2   | P3   | P4   | P5  |
|----|------|------|------|------|-----|
| x1 | 0.18 | 0.41 | 0    | 0    | 0   |
| x2 | 0.18 | 0    | 0    | 0.69 | 0   |
| x3 | 0.18 | 0    | 0    | 0    | 1.1 |
| x4 | 0.18 | 0.41 | 0.41 | 0    | 0   |
| x5 | 0    | 0.41 | 0.41 | 0    | 0   |
| x6 | 0    | 0    | 0.41 | 0.69 | 0   |

As a non-limiting illustrative example, person P1 can receive a weight of 0.18 (e.g., because P1 appears very frequently in the photos of the photo dataset), and person P5 can receive a weight of 1.1 (e.g., because P5 appears the least amount of times).

Photo grouping engine 208 can be used to determine people-groups. In particular, the photo grouping engine 208 can be used to identify people-groups that can be used group photos of a photo dataset into people-group albums. Such people-groups can indicate relationship based social circles. For instance, to identify people-groups, photo grouping engine 208 can analyze how people appear in various photos in a photo dataset in relation to each other. Based on how people appear in relation to each other, photo grouping engine 208 can be used to determine similarity between the photos in the photo dataset. Using the similarity, photos can be clustered. Such clusters can be used to identify the people in the clustered photos to determine related people as people-groups (e.g., indicating a social circle).

Photo grouping engine 208 can include similarity component 214, people-group component 216, and photo component 218. The foregoing components of photo grouping engine 208 can be implemented, for example, in operating environment 100 of FIG. 1A and/or operating environment 112 of FIG. 1B. In particular, those components can be integrated into any suitable combination of user devices 102a and 102b through 102n and server(s) 108 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the photo grouping engine 208.

Similarity component 214 can be used to determine similarity between photos. Similarity can generally be defined as how related two photos are based on the people in the photos. For instance, if a photo (e.g., x2) has two people (e.g., P1 and P4) and a second photo (e.g., x6) has two people (e.g., P3 and P4), similarity between the two photos can be based on the relationship between the people in the two photos (e.g., P1, P3, and P4). Similarity between two photos can be determined using the difference between two vectors. Such vectors can represent the two photos (e.g., for which similarity is being determined). A vector of a photo can indicate the number of people in the photo dataset. For instance, the vector can have dimensions based on the number of people in the photo dataset. As an example, in a photo dataset with five people, the dimension of the vector of a photo can be five (e.g., such that each dimension can represent one of the five people). The photo vectors used to determine similarity can incorporate the person values (e.g. as determined using normalization component 212) indicating the importance of each person in a photo. For instance, the x2 photo (as discussed above) can be represented as a photo vector (e.g., x2=[0.18 0.0 0.0 0.69 0.0]) such that person P1 in x2 has a person value of 0.18 while person P4 can have a person value of 0.69. The x6 photo can be represented as a second photo vector (e.g., x6=[0.0 0.0 0.41 0.69 0.0]) such that person P3 can have a person value of 0.41 and person P4 can have a person value of 0.69.

In embodiments, similarity between photos can be determined using cosine similarity. The cosine similarity between two vectors (e.g., that represent two photos, respectively) can measure the cosine angle between the two vectors. An example equation for determining cosine similarity is:

$$\text{similarity} = \cos\theta = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

Measuring the cosine angle between two vectors can indicate the similarity between two photos in a vector space where each person is represented as a unique dimension (e.g., based on the person values). In particular, because each dimension space of the vector (e.g. representing a photo) represents a unique person, it is advantageous to use a similarity metric that measures direction between the vectors as well as absolute distance magnitude. For instance, using cosine similarity to determined similarity is advantageous because it not only incorporates the magnitude between two photos (e.g., based on difference between the photo vectors) but also incorporates dimensions between the two photos (e.g., based on the person values). In this way, cosine similarity can essentially compare photos in a normalized space because the equation can take into consideration the magnitude of each person (e.g., using the person values) of each photo as well as the cosine angle between the photos. Using the above example, with the addition of a third photo (e.g., x5=[0.0 0.41 0.41 0.0 0.0]) that has two people (e.g., P2 and P3), similarity between photos x2 and x6 can be based on the relationship between P1, P3, and P4 (e.g., cosine similarity=0.832) and similarity between photos x5 and x6 can be based on the relationship between P2, P3, and P4 (e.g., cosine similarity=0.361).

People-group component 216 can be used to determine people-groups using the similarity between photos indicative of relationships between people. People-group component 216 can use customized clustering to group the photos of the photo dataset into clusters that can be used to identify people-groups. The clusters can contain photos with people that are related (e.g., similar). Determining the people in each cluster can be indicative of social groups with related people.

People-group component 216 can include clustering element 220, outlier element 222, group element 224, and refinement element 226. The foregoing elements of people-grouping engine 216 can be implemented, for example, in operating environment 100 of FIG. 1A and/or operating environment 112 of FIG. 1B. In particular, those elements can be integrated into any suitable combination of user devices 102a and 102b through 102n and server(s) 108 and/or user device 114. While the various elements are depicted as separate elements, it should be appreciated that a single element can perform the functionality of all elements. Additionally, in implementations, the functionality of the elements can be performed using additional elements, components, and/or engines. Further, it should be appreciated that the functionality of the elements can be provided by a component separate from the people-group component 216.

Clustering element 220 can use clustering to group photos of the photo dataset to identify people-groups. In particular, clustering element 220 can group the photos based on relationships between people in the photo dataset that can be used to identify people-groups indicative of social circles. Such clusters of photos can include similar people (e.g., the people that are in the photos of a cluster). Clustering can divide photos into a number of groups such that the photos in a cluster can include similarly related people.

In embodiments, a customized density-based spatial clustering of applications with noise ("DBSCAN") algorithm can be used to create clusters of photos. The DBSCAN algorithm is a density-based non-parametric clustering algorithm. Clustering using the DBSCAN algorithm can be advantageous because a number of clusters does not need to be defined. Instead, the DBSCAN algorithm determines clusters based on two defined parameters of the algorithm (e.g., epsilon and the minimum number of points required to form a cluster). Epsilon (e.g., ε) can indicate how close points (e.g., photos) should be to be designated as a cluster. The minimum number of points required to form a cluster (e.g., minPts) can indicate a number of neighbors (e.g., photos) a point (e.g., a photo) should have to be included in a cluster. Determining the parameters of the DBSCAN algorithm can be difficult. If the parameters are not correctly defined, clusters can include excessive noise (e.g., incorrectly assigned photo) or can split up similar points (e.g., photos) into different clusters. Oftentimes, the DBSCAN algorithm will create clusters with varying densities. Because the parameters of the DBSCAN algorithm are fixed, single optimized parameter values can be misapplied to clusters with different densities. To accommodate variance in cluster density, the DBSCAN algorithm can be customized based on the photo dataset. In particular, information associated with the photo dataset can be used to dynamically determine an efficient division of space from clusters. Such information can be location data associated with the photos of the photo dataset. Division from clusters based on location data can be used to identify optimal parameters based on cluster density that can then be used to cluster the photos based on similarity (e.g., indicating relationships between people of the photo dataset).

To identify the optimal parameters, the photos of the photo dataset can be clustered based on location data. In embodiments, the DBSCAN algorithm can be used to generate clusters based on location data. For instance, the DBSCAN algorithm can be used to cluster photos based on location data (e.g., represented using latitude and longitude). From the clusters based on location data, the values of epsilon and minPt can be deduced. In one instance, the DBSCAN algorithm can be used to cluster photos using latitude and longitude. Density can be determined for each cluster and stored in vector form for each cluster. A default epsilon and minPt can be determined for a median cluster (e.g., based on the determined densities). The default epsilon and minPt can be adjusted based on changed in density for each cluster. These adjusted epsilons and minPts can be used as optimized parameters for the DBSCAN algorithm when clustering of the photos based on similarity (e.g., indicating relationships between people of the photo dataset).

Outlier element 222 can be used to associate outlier photos with clustered photos. An outlier photo can generally be a photo from which relationship information is not readily available. For instance, an outlier photo can only have one person. Because an outlier photo only has one person, it is difficult to cluster such photos based on similarity between photos using the relationships between people in the photos. The clustered photos can be the clusters determined using, for example, the DBSCAN algorithm with adjusted epsilons and minPts. To associate outlier photos with the clusters of photos (e.g., clusters based on association vectors) capture-date data of a photo can be used. Capture-date data can include the date and/or time that a photo was taken. In particular, an outlier photo can be associated with a cluster of photos having a maximal number of photos with the same and/or similar capture-date data (e.g., the cluster with the most photos having the same and/or similar capture-date data). As an example, an outlier photo can be associated with a cluster of photos taken on the same day as the outlier photo.

Group element 224 can be used to identify people-groups from the clusters. For instance, every cluster (e.g., clusters from clustering element 220 with associated outliers from outlier element 222) can be used to determine a people-group. A people-group can generally be a group of similarly related people (e.g., coworkers, family members, etc.). To identify a people-group, each photo in a cluster can be iterated through to identify associated people. A list for the people-group can be created based on the identified people. People can be identified using person identifiers (e.g., person-id or Pid) for the photos in a cluster. For example, if a cluster (e.g. C) is identified as including photos x1, x4, and x5 then C={x1, x4, x5}. For such a cluster the corresponding people-group (e.g., G) can be G={P1, P2, P3}.

Refinement element 226 can be used to refine the identified people-groups. To refine the people-groups, heuristics can be used to improve the quality of the people-groups. In some embodiments, such improvements can remove redundant people from a group. For instance, if a first group from the people-groups (e.g., identified by group element 224) is a subset of one of the other people-groups, then the subset people-group can be discarded. For example, if the first group is {P1, P2, P3} and the second group is {P1, P2, P3, P4}, then {P1, P2, P3} can be discarded. In further embodiments, such improvements can merge people-groups that overlap. For instance, if people-groups have an intersection of union over a predefined threshold, the people-groups can be merged into one people-group. Merging people-groups that overlap can result in a group that contains P4 and P5 in a single group, even if P4 and P5 never appear in a photo together (e.g., P4 and P5 are both coworkers). Such a predefined threshold can be configurable (e.g., 75%, 80%, etc.). A configurable predefined threshold can be used to help determine similarity relationships between people in different people-groups. In some embodiments, the predefined threshold can be automatically configured. In other embodiments, the predefined threshold can be configures by a user (e.g., using an adjustable slider via a user interface).

Photo component 218 can create albums based on the identified people-groups. In particular, photos in the photo dataset can be grouped into albums based on the people-groups. Such people-group albums can include photos based on the clusters (e.g., the clustered photos, photos of people belonging to the people-group). In some embodiments, people in the photo dataset can be assigned one or more group identifiers (e.g., indicating one or more people-groups that a person belongs to). In some other embodiments, when a user is satisfied with a people-group, the people-group can be named (e.g., using a label). Upon adding a name to a people-group, the people-group can be prevented from undergoing any further modification. In some embodiments, if a people-group is not named and new photos are added (e.g., to the photo database), then the people-group can be further modified. In some instances, to create an album, photos for an identified people-group can automatically be organized into folders. In other instances, to create an album, a metadata tag can be added photos for an identified people-group that indicates the people-group.

Figure 3:
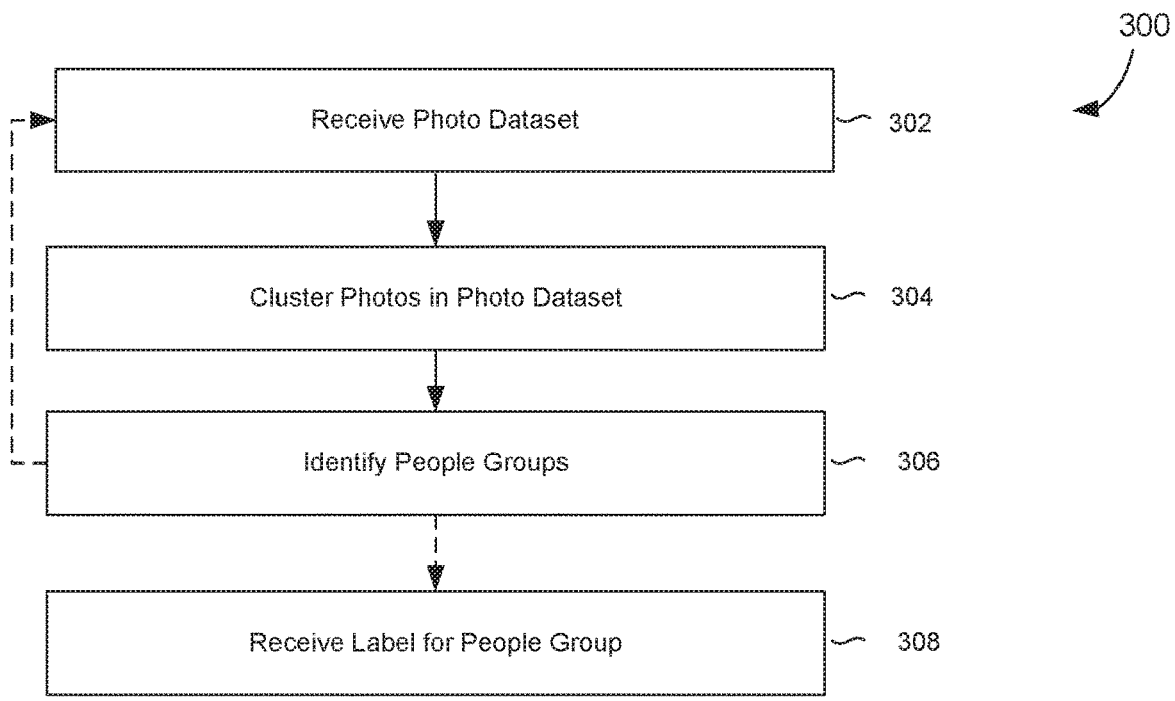
FIG. 3 depicts a process flow showing an embodiment of identifying people-groups based on relationships for use in cataloging photos of a photo dataset, in accordance with various embodiments of the present disclosure.

Turning now to FIG. 3, a process flow is provided showing a method 300 depicting an example of identifying people-groups based on relationships for use in cataloging photos, in accordance with various embodiments of the present disclosure. Such identification can be performed, for instance, using the people-group cataloging system 204 as discussed with reference to FIG. 2.

At block 302, a photo dataset can be received. Such a photo dataset can be received from, for example, a photo dataset and/or from a database stored in the cloud. The photo dataset can be comprised of a set of photos (e.g., images) and corresponding photo information (e.g., asset identifiers, people information, location information, capture-date information, etc.). Such a photo dataset can be processed (or pre-processed) to create a feature set of data that can be used to cluster the photos of the photo dataset. For instance, the photo dataset can be processed such that the data is represented in vector form. Further, the photo dataset can undergo processing to normalize the data to reduce and/or remove bias (e.g., based on frequently appearing people in the photo dataset).

At block 304, photos in the photo dataset can be clustered. Clustering the photos can group the photos into people-groups indicative of social circles based on relationships between people in the photo dataset. Such clusters of photos can include similar people. Clustering can divide photos into a number of groups such that the photos in a cluster can include similarly related people. In embodiments, to create clusters of photos, a customized density-based spatial clustering of applications with noise ("DBSCAN") algorithm can be used. The DBSCAN algorithm determines clusters based on two defined parameters of the algorithm (e.g., epsilon and the minimum number of points required to form a cluster). The customized DBSCAN algorithm can use optimized parameters determined from clusters based on location data (e.g., latitude and longitude). These optimized parameters can then be used to cluster the photos based on similarity between the photos (e.g., indicating relationships between people of the photo dataset). In embodiments, similarity can be based on cosine similarity. In some embodiments, outlier photos can be associated with the clustered photos. An outlier photo can generally be a photo from which relationship information is not readily available (e.g., a photo with only one person). To associate outlier photos, capture-date data of a photo can be used.

At block 306, a people-group can be identified. To identify a people-group, each photo in a cluster can be iterated through to identify associated people. A list of people for the people-group can be created based on the identified people. People can be identified using person identifiers (e.g., person-id or Pid) for the photos in a cluster. In embodiments, the identified people-groups can be refined. Refinement can include removing a redundant people-group and/or merging people-groups that overlap.

At block 308, a label for a people-group can be received. The label can be a user-input label that indicates the relationship between the people in the people-group. Such a label can indicate the relationship between the similarly related people in the people-group. For instance, such a relationship can be coworkers, elementary school friends, college buddies, immediate family members, extended family members, cousins, etc. When a people-group is labeled, that people-group can be used to create an associated album. For instance, the associated album can be a people-group album that contains the clustered photos (and added outlier photos). In embodiments, when a new photo is added to the photo dataset, the photo can be added to the people-group album. When a people-group is not labeled, the people-group identification process can be dynamically updated when a new photo is added to the photo dataset.

Figure 4:
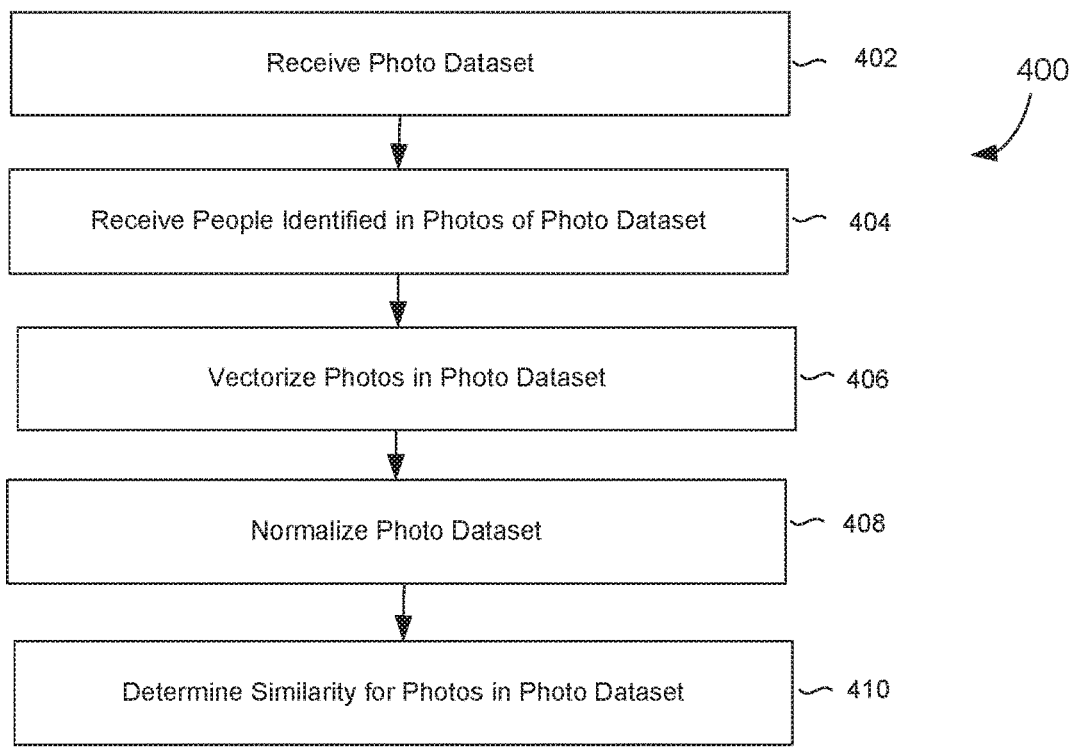
FIG. 4 depicts a process flow embodiment of processing a photo dataset for use in identifying people-groups, in accordance with various embodiments of the present disclosure.

FIG. 4 provides a process flow showing an embodiment of method 400 depicting an example of processing a photo dataset for use in identifying people-groups, in accordance with various embodiments of the present disclosure. Process flow 400 can be carried out, for example by a photo data component 210 and normalization component 212 of person-photo engine 206 as discussed with reference to FIG. 2.

As depicted, process flow 400 begins at block 402 where a photo dataset can be received. Such a photo dataset can be received from, for example, data store 202 of FIG. 2 and/or from a database stored in the cloud. The photo dataset can include photos and associated photo information. Upon receiving a photo dataset, associated photo information can include asset identifiers (e.g., asset-id or Xid) for each photo. An asset identifier can generally be used to designate a photo (e.g., a unique designation associated with a specific photo). Associated photo information can also include location information. Location information can indicate a location at which a photo was taken. For example, location information can be represented using latitude and longitude. Associated photo information can further include capture-time information. Capture-time information can indicate a date and/or time at which a photo was taken.

At block 404, people identifiers in photos of the photo dataset can be received. People identified in a photo can be represented using people information. People information can include face identifiers and/or person identifiers. A face identifier can be based on face data used for facial detection and facial recognition. Face data can be facial features and/or other identifying features that can be used for identifying a person in a photo (e.g., image). For instance, analyzed face data can be used to determine unique face identifiers (e.g., face-id or Fid). A face identifier can be determined using one or more methods capable of identifying a person based on, for instance, facial features. A face identifier can belong to a specific person. Each unique face identifier can have a corresponding person identifier (e.g., person-id or Pid) for an identified person in a photo. A person identifier can be indicative of a person that corresponds to a particular face identifier (e.g., person name or other designation).

Identification of a person/people in a photo can be performed using a background service. In some embodiments, such a background service can be run on a backend server. When using a backend server, a received photo dataset can be sent to the backend server for facial detection and facial recognition. Upon the backend server completing facial detection and facial recognition for photos in the photo dataset, the information can be stored in a database (e.g., a local database or a database stored in the cloud). In other embodiments, such a background service can be run as a background process on a local device (e.g., the local device that received the photo dataset). Upon the background process completing facial detection and facial recognition for photos in the photo dataset, the information can be stored in a database (e.g., a local database or a database stored in the cloud).

The photos in the photo dataset can be vectorized at block 406. Vectorizing the photos in the photo dataset can include transforming photos (and associated information) into a vector form (e.g., vectorizing the data). The photos and associated information can generally be referred to as a feature set of data. The feature set of data can include an asset identifier that designates a specific photo in the photo database and corresponding person identifiers for the photo (e.g., based on people identified in the photo using face identifiers). Such a feature set of data can be transformed into vector form. In this way, the feature set of data in vector form can represent photos and a corresponding list of people identified in each photo. In embodiments, the vector form used to represent the feature set of data can be a sparse matrix. In the sparse matrix, each row can represent a photo identifier and each column can represent a person identifier. For instance, using such a sparse matrix, the value of X[i][j] of the sparse matrix can be set to equal one if an $i^{th}$ photo contains P(j) (e.g., where a value of one indicates the presence of person (j) in the $i^{th}$ photo).

At block 408, the photo dataset can be normalized. In particular, the feature set of data (e.g., in vector form) that represents the photo dataset can be normalized. Normalizing the photo dataset can prevent bias from the data (e.g., based on frequency of appearance of a person in photos). For instance, a photo dataset often includes a disproportionate number of photos related to a particular group (e.g., of the owner of the photo datasetand/or the owner's immediate family members). Normalizing the photo dataset can prevent or lessen bias in the system when identifying people-groups. To perform normalization, values of people in the photo dataset can be determined and applied to the feature set of data. A person value can generally indicate how much value a person brings to a group. For instance, a person that frequently appears in photos can have a lesser person value than a person that infrequently appears in photos. Applying such a person value as a weight the feature set of data can prevent or lessen bias in the system.

In embodiments, person values of people in the photo dataset can be determined using inverse document frequency ("IDF"). An example equation for determining IDF can be: IDF(p)=log (total number of photos/number of photos with person p). In particular, IDF can be used to weight the feature set of data (e.g., applied based on the people that appear in a photo). As a non-limiting illustrative example, person P1 can receive a weight of 0.18 (e.g., because P1 appears very frequently in the photos of the photo dataset) and person P5 can receive a weight of 1.1 (e.g., because P5 appears the least amount of times.

At block 410, similarity between photos in the photo dataset can be determined. Similarity can generally be defined as how related two photos are based on the people in the photos. For instance, if a photo (e.g., x2) has two people (e.g., P1 and P4) and a second photo (e.g., x6) has two people (e.g., P3 and P4), similarity between the two photos can be based on the relationship between the people in the two photos (e.g., P1, P3, and P4). Similarity can be determined based on the difference between two vectors that represent two photos (e.g., for which similarity is being determined). The photo vectors used to determine similarity can incorporate the person values indicating the importance for each person in a photo. Similarity can be determined using cosine similarity to measure the cosine angle between two vectors that represent two photos. Measuring the cosine angle between two vectors can indicate the similarity between two photos in a vector space where each person is represented as a unique dimension (e.g., based on the person values). Using cosine similarity to determined similarity not only incorporates the magnitude between two photos (e.g., based on difference between the photo vectors) but also incorporates dimensions between the two photos (e.g., based on the person values). In this way, cosine similarity can essentially compare photos in a normalized space because the equation can take into consideration the magnitude of each person (e.g., using the person values) of each photo as well as the cosine angle between the photos.

Figure 5:
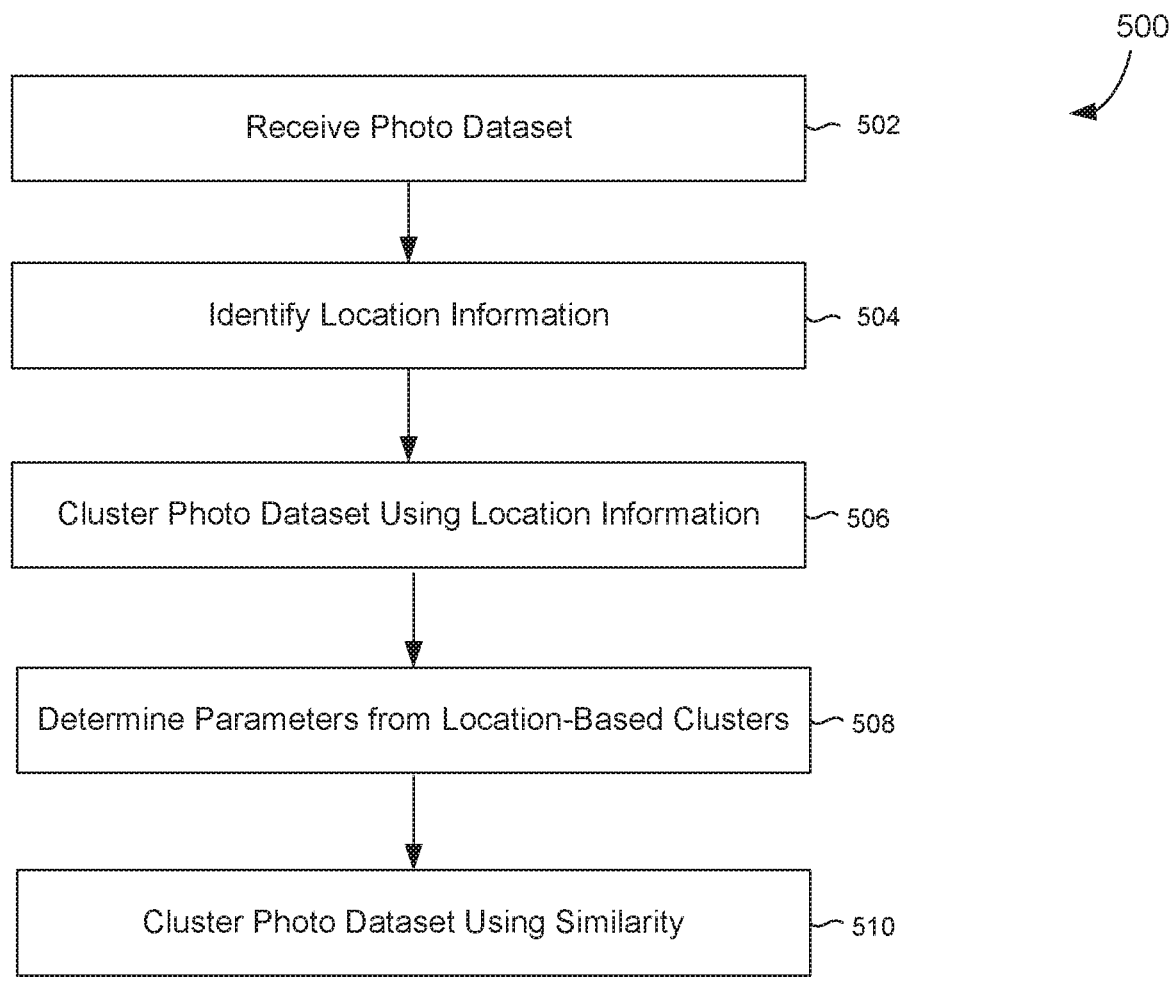
FIG. 5 depicts a process flow showing an embodiment of clustering a photo dataset for use in identifying people-groups, in accordance with various embodiments of the present disclosure.

FIG. 5 provides a process flow showing an embodiment of method 500 depicting an example of clustering a photo dataset for use in identifying people-groups, in accordance with various embodiments of the present disclosure. Such clustering can be performed using photo grouping engine 208 of people-group cataloging system 204 as described with reference to FIG. 2.

At block 502, a photo dataset can be received. The photo dataset can be comprised of a set of photos (e.g., images) and corresponding photo information (e.g., asset identifiers, people information, location information, capture-date information, etc.). Such a photo dataset can be received from, for example, a data store and/or from a database stored in the cloud. At block 504, location information can be identified. Location information can be identified from corresponding photo information. Such location information can be represented using latitude and longitude.

At block 506, the photo dataset can be clustered using location information. Density-based spatial clustering of applications with noise ("DBSCAN") algorithm can be used to perform the clustering. The DBSCAN algorithm can be used to generate clusters based on location data. For instance, the DBSCAN algorithm can be used to cluster photos based on latitude and longitude. The DBSCAN algorithm clusters data based on input parameters (e.g., epsilon and the minimum number of points required to form a cluster). To cluster photos based on location data, the DBSCAN algorithm can be used to group photos using an initial ε and minPt. The generated clusters can then be analyzed based on the location data. For instance, if 1,000 photos of the photo dataset were taken in New York, but only 800 of the photos are included in a cluster based on location data, the input parameters can be adjusted, and the DBSCAN algorithm run with the adjusted input parameters. The input parameters can continue to be updated until the DBSCAN algorithm clusters all photos taken in a location in a single cluster.

At block 508, from a cluster containing photos at a location, an optimal ε and minPt can be deduced. This optimal ε and minPt can be used by the DBSCAN algorithm when clustering of the photos based on similarity at block 510.

Figure 6:
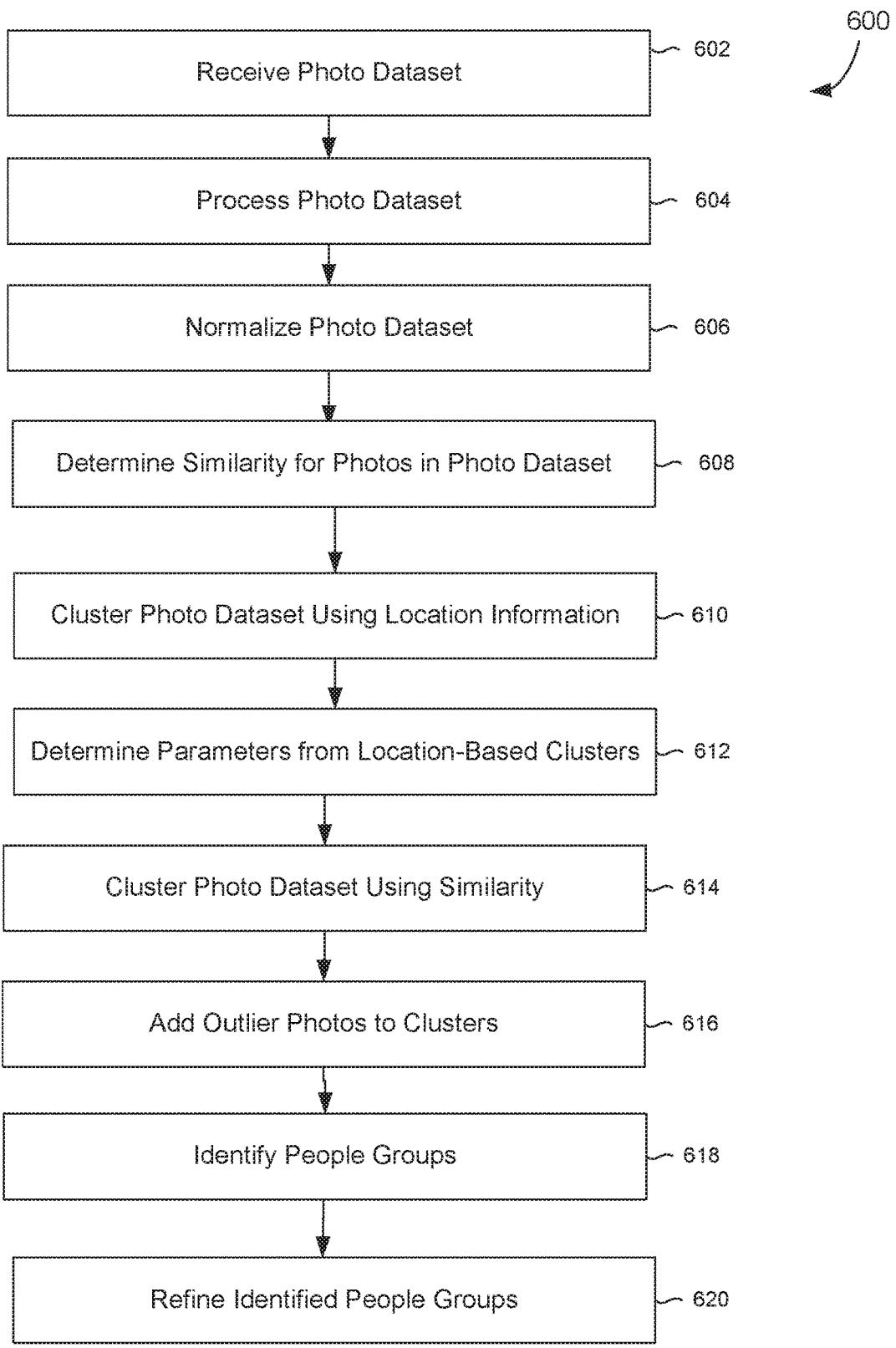
FIG. 6 depicts a process flow showing an embodiment of identifying people-groups from photos in a photo dataset to perform people-group cataloging, in accordance with various embodiments of the present disclosure.

FIG. 6 provides a process flow showing an embodiment of method 600 depicting an example of identifying people-groups from photos in a photo dataset to perform people-group cataloging, in accordance with various embodiments of the present disclosure. Such identification of people-groups from photos can be performed, for instance, using person-photo engine 206 and photo grouping engine 208 as described with reference to FIG. 2.

At block 602, a photo dataset can be received. Such a photo dataset can be received from, for example, a data store and/or from a database stored in the cloud. The received photo dataset can include photos and corresponding associated photo information (e.g., asset identifiers, location information, capture-date information, etc.).

At block 604, the photo dataset can be processed. Processing the photo dataset can include performing facial detection and facial recognition to identify a person/people in the photos of the photo database. Identification of a person/people in a photo can be performed using a background service. In some embodiments, such a background service can be run on a backend server. In other embodiments, such a background service can be run as a background process on a local device (e.g., the local device that received the photo dataset). Upon completion of facial detection and facial recognition for photos in the photo dataset, the information can be stored in a database (e.g., a local database or a database stored in the cloud). In particular, the information can be stored along with the corresponding associated photo information. Processing the photo dataset can further include vectorizing the photos in the photo dataset. Vectorizing the photos in the photo dataset can include transforming photos (and associated information) into a vector form. The vector form can represent photos and a corresponding list of people identified in each photo. In instances, such a vector form can be a sparse matrix.

At block 606, the photo dataset can be normalized. Normalization of the photo dataset can include determining values of people in the photo dataset and using the values to weight the vectorized representation of the photos (e.g., based on the list of people that appear in the photos). Applying such a person values as a weight can prevent or lessen bias in the system. In embodiments, person values of people in the photo dataset can be determined using inverse document frequency ("IDF").

Upon weighting the photo dataset, at block 608, similarity between the photos of the photo database can be determined. In particular, similarity can be determined based on the difference between two vectors that represent two photos (e.g., for which similarity is being determined). Similarity can be determined using cosine similarity. The cosine similarity between two vectors can measure the cosine angle between the two vectors. Using cosine similarity to determine similarity incorporates the magnitude between two photos (e.g., based on difference between the photo vectors) and also incorporates dimensions between the two photos (e.g., based on the person values). In this way, cosine similarity can compare photos in a normalized space because the equation can take into consideration the magnitude of each person (e.g., using the IDF value) of each photo as well as the cosine angle between the photos.

At block 610, the photos of the photo dataset can be clustered using location information. Density-based spatial clustering of applications with noise ("DBSCAN") algorithm can be used to perform the clustering. Clustering the photos using location information can help determine optimal input parameters (e.g., epsilon and the minimum number of points required to form a cluster) for clustering the photos of the photo dataset. Epsilon (e.g., ε) can indicate how close points should be to be designated as a cluster. The minimum number of points required to form a cluster (e.g., minPts) can indicate a number of neighbors a point should have to be included in a cluster. The DBSCAN algorithm can be performed using an initial ε and minPt. The generated clusters from the initial ε and minPt can be analyzed based on the location data. For instance, the analysis can compare the photos in the clusters with the location data of the photos. Such an analysis can determine, for example, that 1,000 photos of the photo dataset were taken in New York, but only 800 of the photos are included in a cluster based on location data. From such an analysis, the input parameters can be adjusted and the DBSCAN algorithm run with the adjusted input parameters. The input parameters can continue to be updated and the DBSCAN algorithm used to group the photos into clusters until all the photos taken in a location are a single cluster together. From a cluster containing all the photos at a location, an optimal ε(s) and minPt(s) can be deduced at block 612.

At block 614, the photos of the photos dataset can be clustered. The optimal ε(s) and minPt(s) (e.g., determined at block 612) can be used to cluster the photos of the photos dataset using the DBSCAN algorithm based on similarity. At block 616, outlier photos can be added to the clustered photos. An outlier photo can generally be a photo from which relationship information is not readily available. For instance, an outlier photo can only have one person. To add the outlier photos to the clusters of photos (e.g., clusters based on association vectors) capture-date data of a photo can be used. In particular, an outlier photo can be added to a cluster of photos with a maximum number of photos with the same capture-date.

At block 618, people-groups can be identified from the clusters. For instance, every cluster (e.g., clusters with added outlier photos) can have a people-group. A people-group can generally be a group of similarly related people (e.g., coworkers, family members, etc.). In a cluster, each photo can be iterated through to identify associated people. A list of people for the people-group can be created based on the identified people. People can be identified using person identifiers (e.g., person-id or Pid) for the photos in a cluster. At block 620, the identified people-groups can be refined. To refine the people-groups, heuristics can be used to improve the quality of the people-groups. In some embodiments, such improvements can remove redundant people from a group. For instance, if a group, from the people-groups, is a subset of one of the other people-groups, then the subset people-group can be discarded. In further embodiments, such improvements can merge people-groups that overlap. For instance, if people-groups overlap over a predefined threshold, the people-groups can be merged into one people-group. Such a predefined threshold can be configurable. A configurable predefined threshold can be used to help determine similarity relationships between people in different people-groups.

Figure 7:
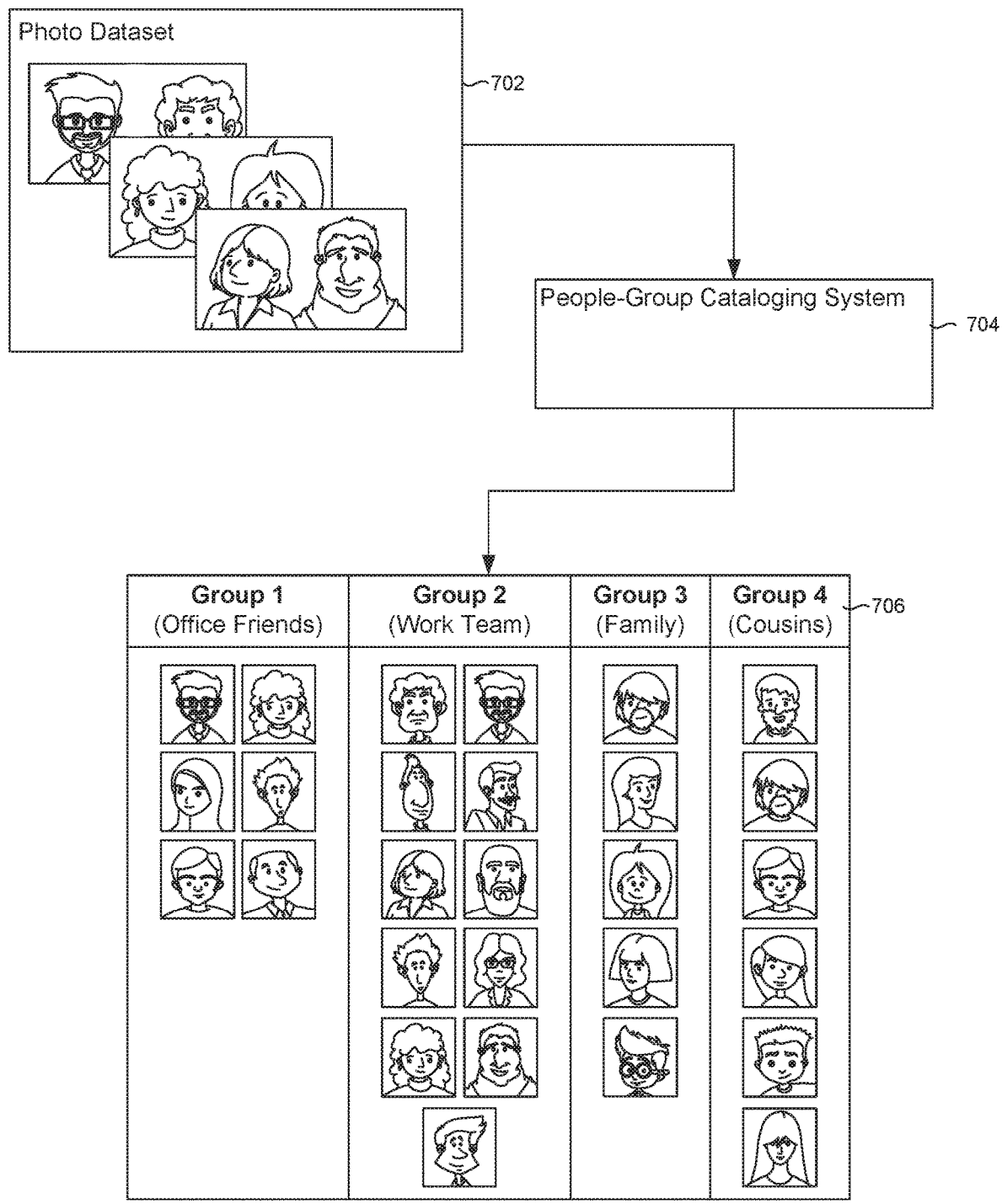
FIG. 7 illustrates an example of intelligently creating people-groups based on relationships between people in the photos of a photo dataset, in accordance with embodiments of the present disclosure.

FIG. 7 depicts example of intelligently creating people-groups based on relationships between people in the photos of a photo dataset, in accordance with embodiments of the present disclosure. Photo dataset 702 can be received. Such a photo dataset can be received from, for example, a data store and/or from a database stored in the cloud. The photo dataset can be comprised of a set of photos (e.g., images) and corresponding photo information (e.g., asset identifiers, people information, location information, capture-date information, etc.). People-group cataloging system 704 can determine intelligent people-groups based on relationships between people in the photo dataset. For instance, people-group cataloging system 704 can analyze how people appear in various photos in a photo dataset relative to each other to determine how the people of the photo dataset relate to one other. Upon identifying intelligent people-groups, people-groups 706 can be presented.

Figure 8:
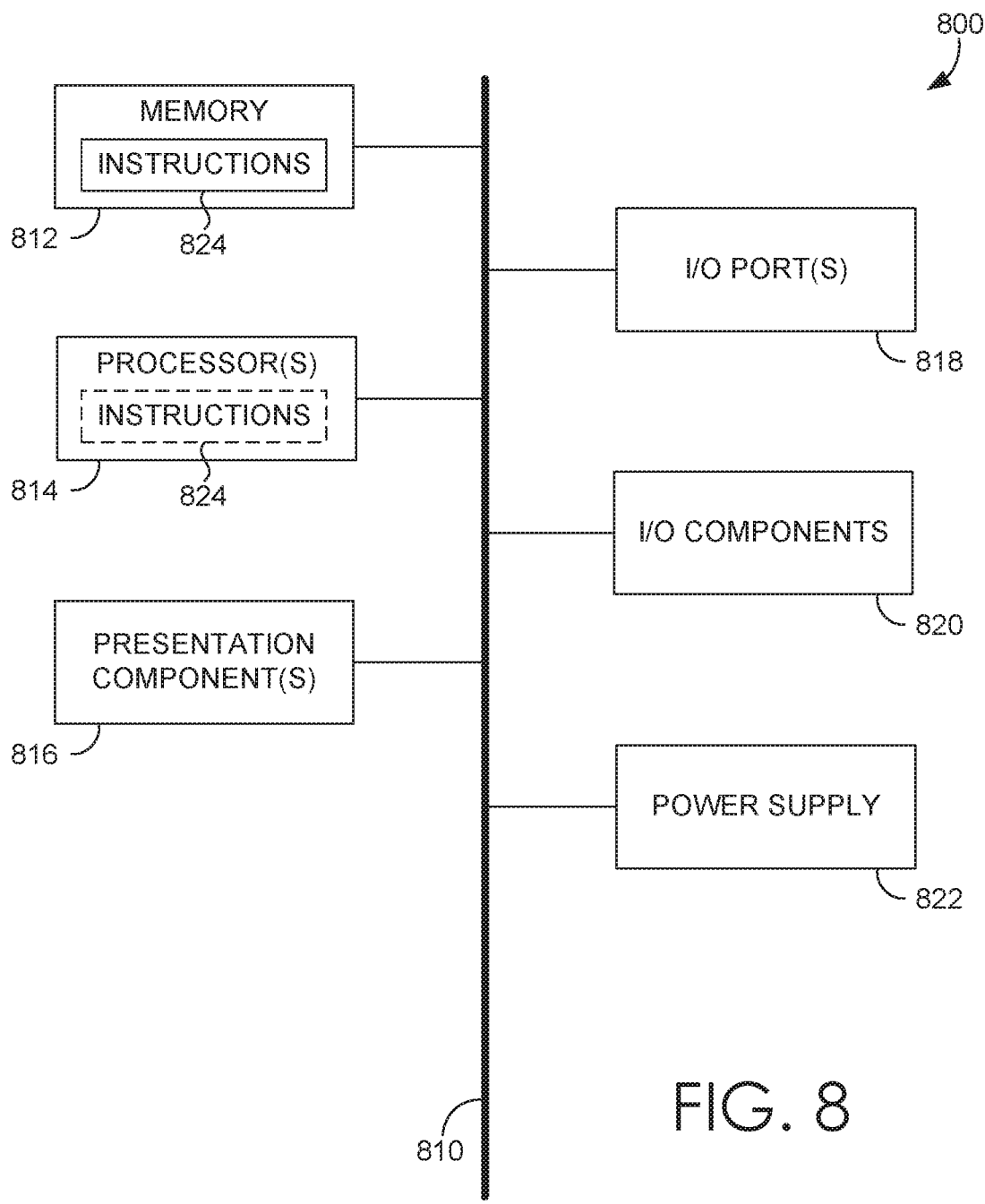
FIG. 8 is a block diagram of an example computing device in which embodiments of the present disclosure can be employed.

Having described embodiments of the present invention, FIG. 8 provides an example of a computing device in which embodiments of the present invention can be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one can consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. I/O components 820 can provide a natural user interface (NUI) that processes air gestures, voice, or other physiological inputs generated by a user. In some instances, inputs can be transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 can be equipped with depth cameras, such as stereoscopic camera systems, infrared camera systems, RGB camera systems, and combinations of these, for gesture detection and recognition. Additionally, computing device 800 can be equipped with accelerometers or gyroscopes that enable detection of motion. The output of the accelerometers or gyroscopes can be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments can be practiced with only some of the described aspects. For purposes of explanation, specific numbers, materials, and configurations are set forth in order to provide a thorough understanding of the illustrative embodiments. However, it will be apparent to one skilled in the art that alternate embodiments can be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules can be merged, broken into further sub-parts, and/or omitted.

The phrase "in one embodiment" or "in an embodiment" is used repeatedly. The phrase generally does not refer to the same embodiment; however, it can. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, the method comprising:
    identifying photo representations for photos of a photo dataset, wherein a photo representation indicates people from the photo dataset and a frequency of appearance of the people in the photos of the photo dataset;
    determining similarity between the photos using the photo representations, the similarity between the photos indicative of relationships between the people in the photos of the photo dataset;
    grouping the photos of the photo dataset into photo groups based on the similarity between the photo representations;
    identifying a set of related people from a photo group of the photo groups, the set of related people depicted in the photos of the photo group; and
    refining sets of related people, the sets of related people including the set of related people, by performing at least one of removing a redundant set of related people and merging an overlapping set of related people.

2. The computer-implemented method of claim 1, wherein the grouping of the photos of the photo dataset comprises:
    clustering the photos of the photo dataset based on the similarity using clustering parameters determined from location information associated with the photos of the photo dataset.

3. The computer-implemented method of claim 1, further comprising:
    performing face detection and recognition to identify the people in the photos of the photo dataset.

4. The computer-implemented method of claim 1, wherein the frequency of appearance of the people in the photos of the photo dataset is based on inverse document frequency.

5. The computer-implemented method of claim 1, wherein the photo representations for the photos are vectors.

6. The computer-implemented method of claim 5, wherein similarity is determined using cosine similarity to measure a cosine angle between two vectors that represent two photos of the photos of the photos database.

7. The computer-implemented method of claim 2, further comprising:
    clustering the photos of the photo dataset based on the location information to determine the clustering parameters.

8. The computer-implemented method of claim 1, further comprising:
    associating an outlier photo with one of the photo groups having a maximum number of photos with related capture-date data.

9. The computer-implemented method of claim 1, further comprising:
    associating an outlier photo with one of the photo groups based on related capture-date data.

10. One or more non-transitory computer-readable media having a plurality of executable instructions embodied thereon, which, when executed by one or more processors, cause the one or more processors to perform a method, the method comprising:
    processing a photo dataset to represent photos of the photo dataset as vectors that include importance of people in the photos, wherein the processing of the photo dataset includes normalizing the vectors of the photos of the photo dataset;
    analyzing the vectors of the photos of the photo dataset to determine similarity between pairs of the photos, the similarity indicative of relationships between the people in the photos of the photo dataset;
    clustering the photos of the photo dataset based on the similarity using clustering parameters determined from location information associated with the photos of the photo dataset; and
    identifying people-groups from the clusters of the photos.

11. The media of claim 10, the method further comprising:
    associating an outlier photo with a cluster of photos having a maximum number of photos with related capture-date data.

12. The media of claim 10, the method further comprising:
refining the people-groups by performing one or more of removing redundant people-groups and merging overlapping people-groups.

13. The media of claim 10, the method further comprising:
creating people-group albums based on the people-groups.

14. The media of claim 10, wherein the processing of the photo dataset comprises performing face detection and recognition.

15. The media of claim 10, wherein normalizing the vectors is based on determining person values for the people in the photos.

16. The media of claim 14, wherein determining person values uses inverse document frequency.

17. The media of claim 10, wherein similarity is determined using cosine similarity to measure a cosine angle between two vectors that represent two photos of the photos of the photos database.

18. A computing system comprising:
means for analyzing photos of a photo dataset to determine similarity between the photos indicative of relationships between the people in the photos of the photo dataset; and
means for clustering the photos of the photo dataset using the similarity using clustering parameters determined from location information associated with the photos of the photo dataset and based on capture-date data such that an outlier photo is clustered based on the capture-date data.

19. The system of claim 18, further comprising:
means for identifying people-groups from clusters of the photos created using the clustering based on the similarity.

20. The system of claim 18, further comprising:
means for determining similarity between the photos using cosine similarity to measure a cosine angle between two vectors that represent two photos of the photos of the photos database.

* * * * *